(12) United States Patent
Shimoda et al.

(10) Patent No.: US 7,578,666 B2
(45) Date of Patent: Aug. 25, 2009

(54) MOLDING MACHINE SYSTEM

(75) Inventors: Toshio Shimoda, Saitama (JP);
Toshifumi Furukawa, Saitama (JP);
Satoshi Imaeda, Nagoya (JP)

(73) Assignee: Mitsubishi Heavy Industries Plastic Technology Co., Ltd., Aichi (JP)

( * ) Notice: Subject to any disclaimer, the term of this patent is extended or adjusted under 35 U.S.C. 154(b) by 185 days.

(21) Appl. No.: 11/817,663

(22) PCT Filed: Sep. 12, 2006

(86) PCT No.: PCT/JP2006/318044

§ 371 (c)(1),
(2), (4) Date: Aug. 31, 2007

(87) PCT Pub. No.: WO2007/034710

PCT Pub. Date: Mar. 29, 2007

(65) Prior Publication Data

US 2009/0053347 A1 Feb. 26, 2009

(30) Foreign Application Priority Data

Sep. 21, 2005 (JP) .............................. 2005-274200

(51) Int. Cl.
*B29C 45/78* (2006.01)
(52) U.S. Cl. ..................... 425/144; 264/40.6
(58) Field of Classification Search ................. 425/143, 425/144; 254/40.6
See application file for complete search history.

(56) References Cited

U.S. PATENT DOCUMENTS 5,423,670 A * 6/1995 Hamel ........................ 425/144
5,705,201 A * 1/1998 Ibar ........................... 425/143
2005/0012059 A1 * 1/2005 Wieder ....................... 425/144

FOREIGN PATENT DOCUMENTS

JP 2001-018229 A 1/2001
JP 2005-238456 A 9/2005

OTHER PUBLICATIONS

International Search Report for PCT/JP2006/318044 mailed Nov. 21, 2006.

* cited by examiner

*Primary Examiner*—Tim Heitbrink
(74) *Attorney, Agent, or Firm*—Kanesaka Berner & Partners

(57) ABSTRACT

Provided is a molding machine system enabling a free setting of execution timings of respective steps in a molding cycle of heating of a mold, injection and pressure holding of a molding material, cooling of the mold, etc. The molding machine system repeating a series of molding cycle comprises three temperature sensors arranged at predetermined places of a mold, a change-over valve unit having a heat medium channel by which heating medium from a heating unit, cooling medium from a cooling unit and pressurized air are changed over to be supplied into and recovered from the mold and a molding control means, provided on the change-over valve unit, having a temperature judging program judging respective detected temperatures of the three temperature sensors to give a judgement result and a timer to give a time set signal. A molding operation control is carried out by combining the judgement result with the time set signal and enables an arbitrary supply control of the heating medium, cooling medium and pressurized air to be supplied into the mold and an arbitrary supply control of the molding material to be supplied into the mold.

6 Claims, 5 Drawing Sheets

MOLDING MACHINE SYSTEM

RELATED APPLICATIONS

The present application is based on International Application No. PCT/JP2006/318044 filed Sep. 12, 2006, and claims priority from Japanese Application Number 2005-274200 filed Sep. 21, 2005, the disclosure of which is hereby incorporated by reference herein in its entirety.

TECHNICAL FIELD

The present invention relates to a molding machine system repeating a molding cycle comprising steps of closing and heating of a mold, injection and pressure holding of a molding material, cooling and opening of the mold, taking-out of a molded product and closing of the mold for the next cycle.

BACKGROUND ART

Generally, in a molding system employed in a molding machine, such as an injection molding machine, blow molding machine, thermoforming machine, etc. for molding plastic products or the like, a mold is supplied with heat mediums of two kinds having different temperatures for heating and cooling so as to correspond to heating and cooling processes and a molding cycle comprising a series of steps of heating of the mold, injection and pressure holding of a molding material, molding of a product, cooling of the mold and taking-out of the product is repeatedly carried out.

In such a molding system, conventionally, respective steps of the molding cycle including heating of the mold, injection and pressure holding of the molding material, cooling of the mold, etc. are carried out in accordance with previously set timings and it is the present situation that no such a molding cycle that an execution timing of each of the steps can be freely set is seen yet.

In Patent Document 1 below, there are proposed a mold temperature adjusting apparatus and a mold temperature adjusting method in which a temperature detecting sensor of heat medium is provided near a heat medium channel outlet in each of a fixed mold and a movable mold so that controls of flow-in and recovery of steam, mold closing, steam pressure holding, injection, flow-in and recovery of cooling water, etc. are executed by combining an opening time of a steam flow-in change-over valve or cooling water flow-in change-over valve with a temperature of the heat medium in the channel detected by the temperature detecting sensor.

Nevertheless, even in case of this Patent Document 1, it enables no free setting of execution timings of respective steps in the molding cycle of heating of a mold, injection and pressure holding of a molding material, cooling of the mold, etc. Also, in case of the Patent Document 1, as the temperature detecting sensor is provided neither in the fixed mold itself nor in the movable mold itself, it is difficult to accurately detect the mold temperature to thereby carry out an ideal temperature control of the mold.

Patent Document 1: Japanese laid-open patent application 2001-18229

DISCLOSURE OF THE INVENTION

In view of the problems in the prior art, it is an object of the present invention to provide a molding machine system enabling a free setting of execution timings of respective steps in a molding cycle of heating of a mold, injection and pressure holding of a molding material, cooling of the mold, etc.

In order to achieve the object as mentioned above, the present invention provides a molding machine system repeating a molding cycle, the molding cycle comprising steps of closing and heating of a mold, injection and pressure holding of a molding material, cooling and opening of the mold, taking-out of a molded product and closing of the mold for the next cycle, characterized in that: the molding machine system comprises; a plurality of temperature detecting portions arranged at predetermined places of the mold, a change-over valve unit having a heat medium channel by which heating medium from a heating unit, cooling medium from a cooling unit and pressurized air are changed over to be supplied into and recovered from the mold and a molding control means having a temperature judging program judging respective detected temperatures of the plurality of temperature detecting portions to give a judgement result and a timer to give a time set signal; a molding operation control is carried out by combining the judgement result given by the temperature judging program with the time set signal given by the timer; and the molding operation control enables an arbitrary supply control of the heating medium and cooling medium to be supplied into the mold from the change-over valve unit at the time of the mold heating step and mold cooling step and an arbitrary supply control of the molding material to be supplied into the mold.

According to the present invention, the following effects can be obtained:

According to the invention, it becomes possible to freely change a flow-in timing of steam as the heating medium to flow into the mold in the mold heating step, an injection timing of a resin as the molding material to be injected into the mold, a flow-in timing of cooling water as the cooling medium to flow into the mold in the mold cooling step and a blow timing of air as the pressurized air to be blown into the mold for preventing an excess cooling of the mold in the mold cooling step. Thereby, a molding machine system that can realize a molding cycle putting importance on the mold temperature or having a freedom of temperature control of the mold can be provided.

If the construction is made such that three temperature sensors, for example, are provided as the plurality of temperature detecting portions and any one of the temperatures detected by the three temperature sensors is used as the judgement result, then the judgement result can be more quickly obtained and the mold operation control of the mold heating step and mold cooling step can be quickly carried out. Moreover, if two or more of the temperatures detected by the three temperature sensors or an average thereof is used as the judgement result, then a molding machine system enabling a mold operation control of the mold heating step and mold cooling step that can accurately reflect the mold temperature can be provided.

According to the invention, the construction is made such that the molding control means is provided on a control panel, for example, of the change-over valve unit. The invention, a molding machine system enabling a molding operation control of the mold heating step and mold cooling step that puts importance on the mold temperature and can accurately reflect the mold temperature can be provided.

According to the invention, the construction is made such that the molding control means is provided on a control panel, for example, of the molding machine main body. The invention further includes a molding machine system enabling a molding operation control of the mold heating step and mold cooling step that puts importance on the mold temperature and can accurately reflect the mold temperature can be provided.

BEST MODE FOR CARRYING OUT THE INVENTION

The object of the present invention to provide a molding machine system enabling a free setting of execution timings of respective steps in a molding cycle of heating of a mold, injection and pressure holding of a molding material, cooling of the mold, etc. has been realized by a molding machine system constructed as follows:

That is, in a molding machine system repeating a molding cycle, the molding cycle comprising steps of closing and heating of a mold, injection and pressure holding of a molding material, cooling and opening of the mold, taking-out of a molded product and closing of the mold for the next cycle, the molding machine system comprises; a plurality of temperature detecting portions arranged at predetermined places of the mold, a change-over valve unit having a heat medium channel by which heating medium from a heating unit, cooling medium from a cooling unit and pressurized air are changed over to be supplied into and recovered from the mold and a molding control means having a temperature judging program judging respective detected temperatures of the plurality of temperature detecting portions to give judgement results that one or more of or an average of the respective detected temperatures has reached a set temperature and a timer to give a time set signal. By this molding machine system so constructed, a molding operation control is carried out by combining any one of the judgement results given by the temperature judging program with the time set signal given by the timer and the molding operation control enables an arbitrary supply finish timing control of the heating medium to be supplied into the mold from the change-over valve unit at the time of the mold heating step, a supply delay control and arbitrary supply finish timing control of the cooling medium to be supplied into the mold from the change-over valve unit at the time of the mold cooling step and an arbitrary supply control of the pressurized air to be supplied into the mold at the time of the mold cooling step as well as an arbitrary supply control of the molding material to be supplied into the mold.

EMBODIMENTS

Herebelow, the present invention will be described more concretely based on molding machine systems of embodiments according to the present invention with reference to appended drawings.

Embodiment 1

Figure 1:
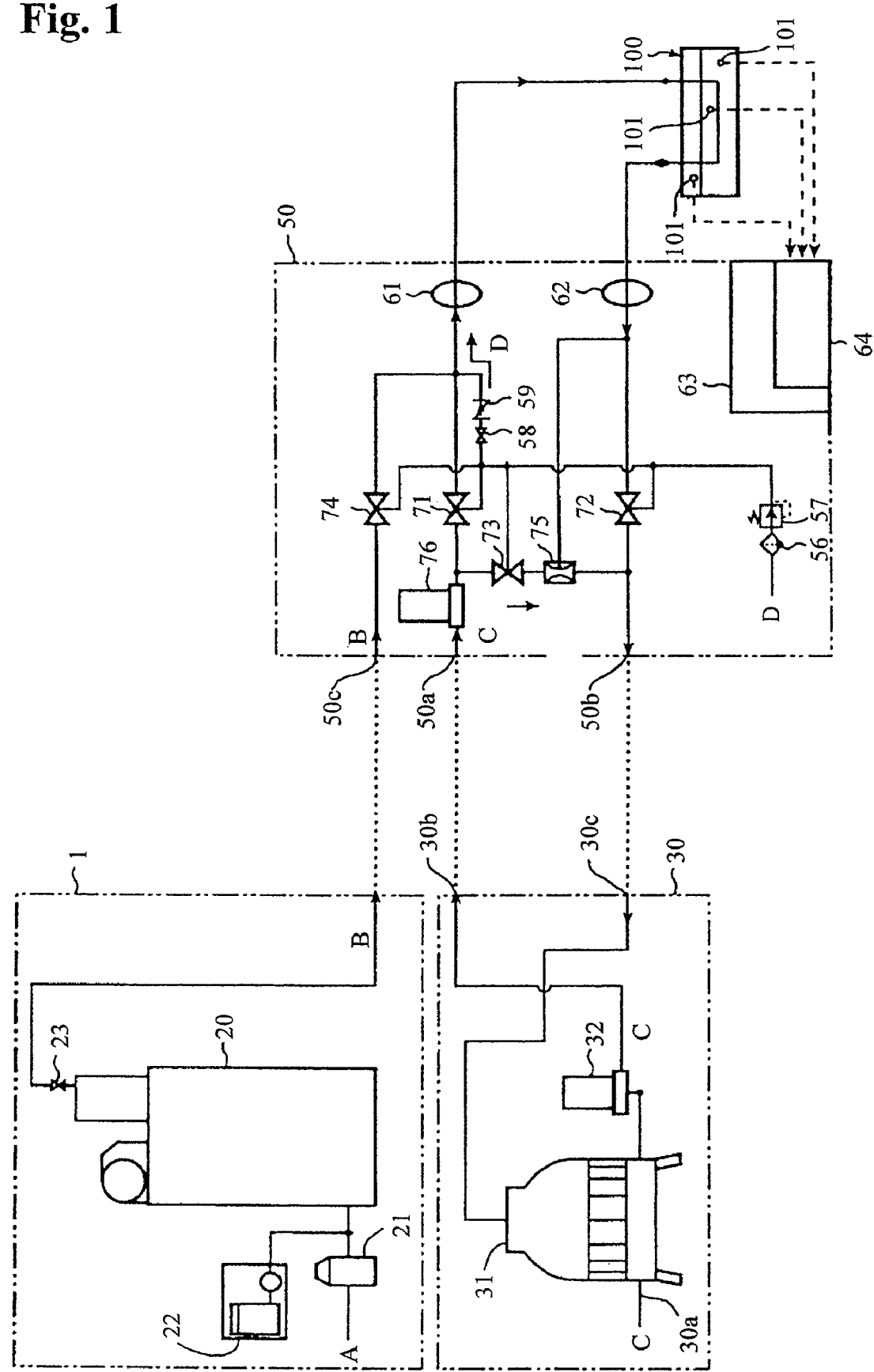
FIG. 1 is a piping construction view of respective elements constructing a molding machine system of Embodiment 1 according to the present invention.

In FIG. 1 showing a molding machine system of Embodiment 1 according to the present invention, this molding machine system comprises a heating unit 1, cooling unit 30, change-over valve unit 50 and mold 100.

The heating unit 1 is constructed such that raw water A is softened at a water softener 21 and is further injected with chemicals, such as an antiseptic or the like, from a chemical injector 22 to be then supplied into a boiler 20. There, the water A is vaporized to steam B to be then supplied from a discharge valve 23 into the change-over valve unit 50 via a steam supply port 50c.

In the cooling unit 30, cooling water C is supplied into a cooling tower (or chiller) 31 via a cooling water supply port 30a so that temperature of the cooling water C is adjusted by heat exchange to be in the range between 10° C. and the ordinary temperature. Then, the cooling water C is supplied by a pump 32 into the change-over valve unit 50 via a cooling water discharge port 30b.

Also, the cooling water C returning from the change-over valve unit 50 via a cooling water return port 30c is caused to flow into an upper part of the cooling tower 31 to be sprayed therein so that the necessary heat exchange is effected.

The change-over valve unit 50 comprises four change-over valves 71, 72, 73, 74 all of which are operated to be opened and closed by air control. That is, the change-over valve unit 50 is constructed such that the cooling water C from the cooling water discharge port 30b of the cooling unit 30 is caused to flow into a pump 76 via a cooling water receiving port 50a to be pressurized there and is then supplied into the mold 100 via the change-over valve 71 and further via a manifold 61.

The cooling water C that has circulated in the mold 100 is led into a cooling water discharge port 50b via a manifold 62 and further via the change-over valve 72 and is then caused to flow into the cooling water return port 30c of the cooling unit 30. Also, between a discharge side of the pump 76 and an outlet side of the change-over valve 72, the change-over valve 73 and a valve (silent reducer) 75 comprising a venturi mechanism are provided and steam from an outlet side of the manifold 62 is supplied into the valve 75.

Air (pressurized air) D to be used for opening and closing controls of the four change-over valves 71 to 74 is supplied from an air source (not shown) via an air filter 56 and air regulator 57.

Also, the air (pressurized air) D supplied from the air source via the air filter 56 and air regulator 57 can be supplied into a piping on an outlet side of the change-over valves 71, 74 via a cock 58 and stop valve 59.

The mold 100 comprises a fixed mold and movable mold and when the mold 100 is closed, a cavity is formed in the mold 100. Temperature of the mold 100 is detected by one or more (three, for example) temperature sensors 101 provided on or in the fixed mold and movable mold or in the vicinity of the cavity. Signals of the detected temperatures of the respective temperature sensors 101 are sent (fed back) to a control means 64 installed on a control panel 63 of the change-over valve unit 50.

The number of the temperature sensors 101 to be provided can be arbitrarily selected, such as 2, 4, 5, etc. other than the above-mentioned three.

Figure 2:
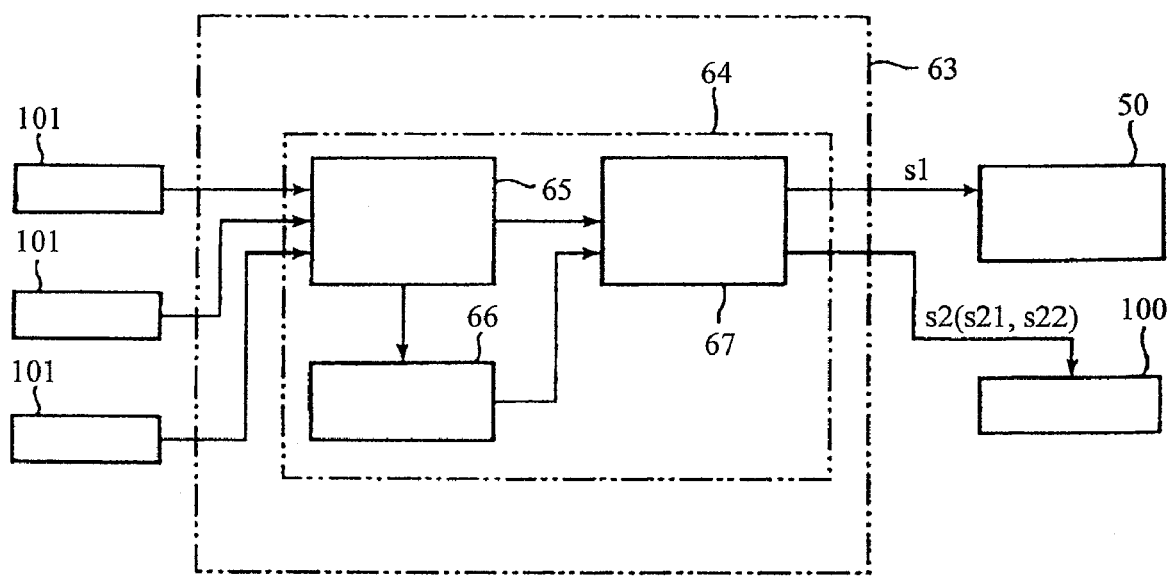
FIG. 2 is a block diagram showing temperature sensors and a molding control means of the Embodiment 1.

The control means 64 comprises, as shown in FIG. 2, a program storing part 65 storing a temperature judging program, a timer 66 putting out a time set signal and a control signal generating part 67. The control signal generating part 67 generates, based on a judgement result given by the temperature judging program and time set signals, a control signal s1 for controlling change-overs of the heating medium, cooling medium and pressurized air to be supplied into the mold 100 at the change-over valve unit 50 and a control signal s2 for controlling molding operations of mold closing, mold opening and the like at the mold 100.

The temperature judging program stored in the program storing part 65 judges, based on detected temperatures of the respective temperature sensors 101, that one or more of these detected temperatures or an average thereof has reached a set temperature and puts out the judgement result into the control signal generating part 67.

Figure 3:
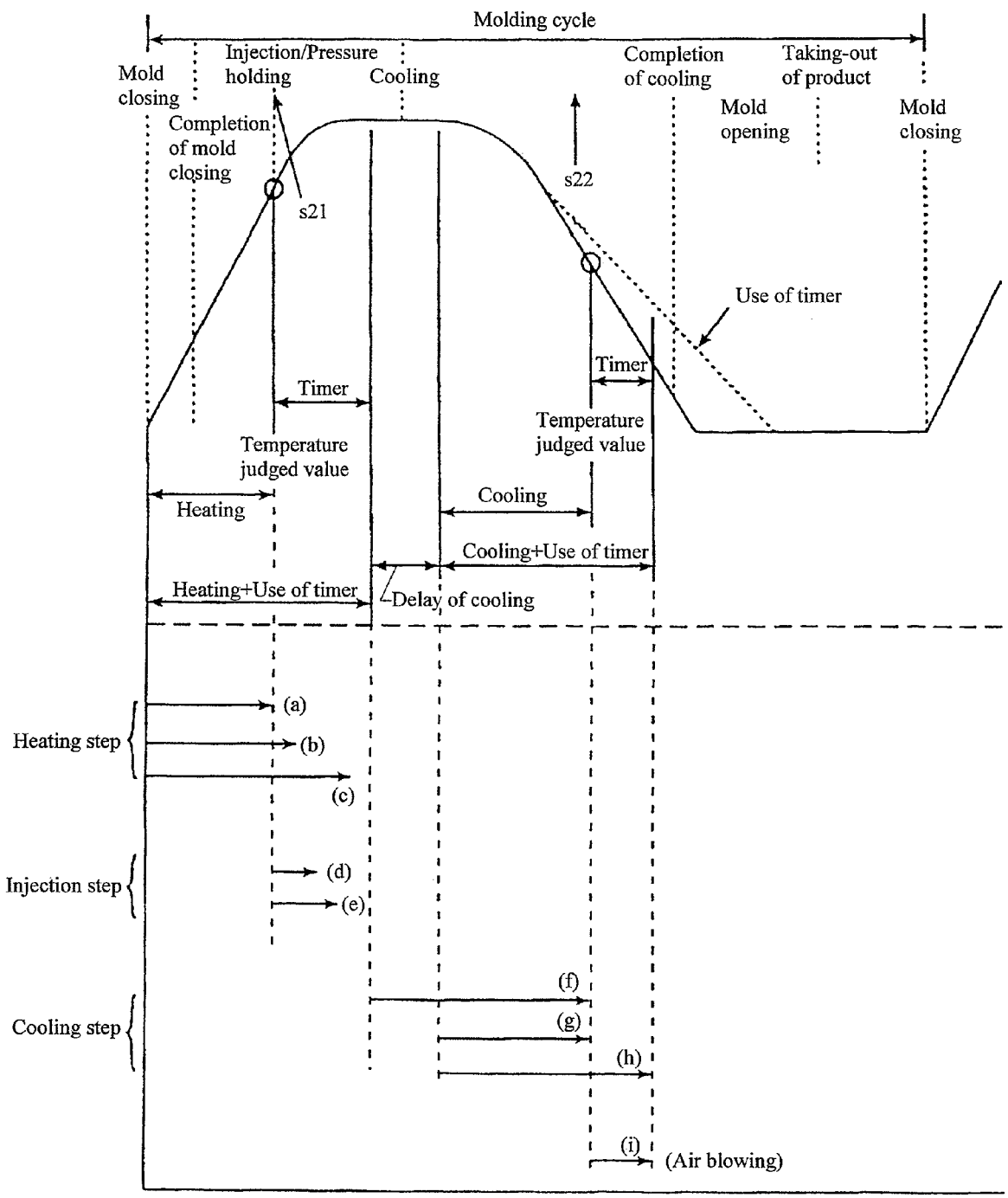
FIG. 3 is a view showing changes of mold temperatures as well as showing execution timings of respective steps in a molding cycle of the Embodiment 1.

As soon as the temperature judging program judges that the set temperature has been achieved in the heating step or cooling step, as shown in FIG. 3, for example, the timer 66 starts to count the time and puts out the time set signal into the control signal generating part 67.

Next, molding operations of a resin product, for example, using the molding system of the present Embodiment 1 will be described with reference to FIG. 3. It is to be noted that FIG. 3 shows changes of mold temperatures in the molding cycle and execution timings of respective steps.

(Closing and Heating Step of the Mold 100)

In the closing and heating step of the mold 100, based on the control signal s2 to the mold 100 and control signal s1 to the change-over valve unit 50 from the control signal generating part 67, closing of the mold 100 is started as well as the change-over valve 74 shown in FIG. 1 is controlled to be opened and the change-over valves 71, 72 to be closed. Also, the change-over valve 73 is controlled to be opened.

At this time, the cooling water C from the cooling unit 30 is in a circulating state where the cooling water C returns to the cooling unit 30 via the pump 76, change-over valve 73 and valve 75, that is, in a state where the cooling water C flows in a circulation channel without passing through the mold 100.

Also, the steam B generated in the heating unit 1 flows through the mold 100 via the change-over valve 74 and manifold 61 so that the heating step to heat the mold 100 to a predetermined temperature is executed and further flows into the circulation channel of the cooling water C via the manifold 62 and the valve 75 comprising the venturi mechanism.

In the above-mentioned heating step, closing of the mold 100 is finished with a predetermined time after starting of the mold closing and the above-mentioned three temperature sensors 101 detect temperatures at three places of the mold 100. The detected signals are sent to the program storing part 65.

The temperature judging program judges, based on the respective detected temperatures from the three temperature sensors 101, that one or more of the detected temperatures or an average thereof has reached a set temperature and sends the judgement result (temperature judged value) to the control signal generating part 67. Also, the judgement result by the temperature judging program is sent to the timer 66 so that the timer 66 starts to count the time and sends time set signals, as shown in FIG. 3, to the control signal generating part 67.

The control signal generating part 67 puts out, based on the judgement result (temperature judged value), an injection start signal s21 as the control signal s2 to the mold 100 so that injection of a resin as a molding material is executed at the mold 100.

By the control done by the control signal generating part 67 based on the judgement result (temperature judged value) and time set signals, the timing to change over the change-over valve 74 of the change-over valve unit 50 to the valve closed state from the valve opened state in the heating step, that is, the timing to stop the flow-in of the steam B to finish the heating step, becomes possible to be arbitrarily set, such as at the time of the temperature judgement [FIG. 3: heating step (a)], during the injection [FIG. 3: heating step (b)], during the pressure holding [FIG. 3: heating step (c)], etc.

Likewise, by the control done by the control signal generating part 67, the timing of injection of the resin as the molding material into the mold 100 also becomes possible to be arbitrarily set, as shown in (d) and (e) in FIG. 3.

In the above-mentioned heating step, the steam B entering the valve 75 can be smoothly discharged into the circulation channel by a sucking effect of the venturi mechanism. That is, flow velocity of the cooling water is elevated at a nozzle portion of the valve 75 and steam pressure at the sucking portion is lowered so that suction of the steam and discharge thereof into the circulation channel at the valve 75 can be smoothly done. As the result, discharge of the steam B into the circulation channel can be smoothly done and the time to elevate the temperature of the mold 100 to a predetermined level in the heating step can be shortened.

(Cooling Step of the Mold 100)

After finishing of the above-mentioned heating step and injection/pressure holding step, the cooling step of the mold 100 is started. In the cooling step, the change-over valves 73, 74 are controlled to be closed and the change-over valves 71, 72 to be opened and cooling of the mold 100 by the cooling water C is executed.

That is, by closing the change-over valves 73, 74 and opening the change-over valves 71, 72, circulation of the cooling water C is formed such that the cooling water C flows sequentially through the pump 32, pump 76, change-over valve 71, manifold 61, mold 100, manifold 62, change-over valve 72 and cooling tower 31 and again to the pump 32. Thereby, cooling of the mold 100 is executed.

Then, after completion of the cooling, based on a mold opening enabling signal s22 from the control signal generating part 67, the mold 100 is opened and a molded product is taken out. Then, the series of steps transferring to the above-mentioned mold closing and heating step are repeatedly executed.

In this case, after finishing of the resin injection into the mold 100, while the mold 100 is being held at a predetermined temperature (usually a high temperature), the timings for the change-over valve unit 50 to execute operations of the cooling step can be variously changed as in the aforementioned case.

That is, an arbitrary control becomes possible by the control by the control signal generating part 67, for example, such that after finishing of the time set signal in the heating step as shown in FIG. 3, the cooling step is immediately started [FIG. 3: cooling step(f)]; after finishing of the time set signal in the heating step as shown in FIG. 3, the cooling step is started with a delay of predetermined time to be executed until the judgement result (temperature judged value) is given based on the detected temperatures of the above-mentioned three sensors 101 in the cooling step [FIG. 3: cooling step (g)] or, moreover, after the delay of predetermined time in the cooling step, the cooling step is executed until the time set signal from the timer 66 is finished [FIG. 3: cooling step (h)]; etc.

Also, a control is enabled by the control by the control signal generating part 67, for example, such that during the time after the judgement result (temperature judged value) in the cooling step is put out and until the time set signal from the timer 66 is finished, the air (pressurized air) D from an air source (not shown) is supplied into the piping channel on the outlet side of the change-over valves 71, 74 via the air filter 56 and air regulator 57 and further via the cock 58 and stop valve 59 so that the air D is blown into the mold 100 to thereby prevent an excess cooling of the mold 100 [FIG. 3: cooling step (i)].

It is to be noted that the air D is also used for purging the cooling water C from the mold 100 by blowing the air D of ordinary temperature into the mold 100 when the cooling water C of low temperature is to be changed over to the steam B of high temperature in the mold 100.

In a temperature characteristic curve of the mold 100 as shown in FIG. 3, the portion of solid line shows a characteristic in a case where the time set signal from the timer 66 is not used in the cooling step and the portion of dotted line shows a characteristic in a case where the time set signal from the timer 66 is used in the cooling step.

It is to be noted that when the judgement result (temperature judged value) is given based on the detected temperatures of the above-mentioned three temperature sensors 101, the control signal generating part 67 puts out the mold opening enabling signal s22 as the control signal s2 to be given to the mold 100.

(Stand-by Time)

In a stand-by time of the molding machine system of the present Embodiment 1, the change-over valve 73 is controlled to be opened and the other three change-over valves 71, 72, 74 are controlled to be closed. At this time, the cooling water C from the cooling unit 30 becomes a circulating state to return to the cooling unit 30 via the pump 76, change-over valve 73 and valve 75. Also, the steam B from the heating unit 1 is not supplied into the mold 100, as the change-over valve 74 is in the closed state.

According to the molding machine system of the present Embodiment 1 as mentioned above, the judgement result (temperature judged value) based on the detected temperatures of the three temperature sensors 101 is combined with the time set signal from the timer 66 so that a control of operations of the mold 100 and change-over valve unit 50 is carried out. Thereby, a flow-in timing of the steam B to flow into the mold 100 in the heating step, an injection timing of the resin to be injected into the mold 100, a flow-in timing of the cooling water C to flow into the mold 100 in the cooling step and a blow timing of the air (pressurized air) D to be blown into the mold 100 in the cooling step for preventing an excess cooling of the mold 100 become possible to be freely changed. Hence, a molding cycle putting importance on the temperature of the mold 100 or having a freedom of temperature control of the mold 100 can be realized.

That is, the control is carried out by the above-mentioned judgement result (temperature judged value) being combined with the time set signal so that the heating step and cooling step are carried out in the optimal temperature range necessitated for the product molding. Thus, a stability of quality of the product can be enhanced.

While the judgement result based on the detected temperatures of the above-mentioned three temperature sensors 101 is used such that the temperature judging program judges that any one or more of, or an average of, the detected temperatures has reached a set temperature, if, as one example, any one of the detected temperatures of the three temperature sensors 101 is used as the judgement result, then in a quicker manner, the judgement result can be obtained and the control of operations of the heating step and cooling step can be likewise carried out. Also, for example, if two or more of, or the average of, the detected temperatures of the three temperature sensors 101 are used as the judgement result, then a control of operations of the heating step and cooling step that accurately reflects the temperature of the mold 100 can be carried out.

By employing the molding machine system of the present Embodiment 1, it was found that the time of the molding cycle of a product of which thickness is large can be shortened approximately to one third as compared with the conventional case.

It is to be noted that in case where the steam B and water C are used as the heating medium and cooling medium, respectively, vibration and noise caused when the steam flows into the valve 75 from the mold 100 can be mitigated.

Embodiment 2

A molding machine system of Embodiment 2 according to the present invention will be described with reference to FIGS. 4 and 5. As the basic construction of the molding machine system of the Embodiment 2 is substantially the same as the Embodiment 1, the same parts and components are shown by the same reference numerals and description thereof will be omitted.

The present Embodiment 2 is featured in being constructed such that the control means 64 is installed not on the control panel 63 of the change-over valve unit 50 but on a control panel 81 of a molding machine main body 80 and by this control means 64, a control of operations of the change-over valve unit 50 and mold 100 is carried out. Construction of other parts and components is the same as the case of the Embodiment 1.

As the molding machine main body 80, a main body constructing a molding machine, such as an injection molding machine, blow molding machine, thermoforming machine, etc. can be named.

Figure 4:
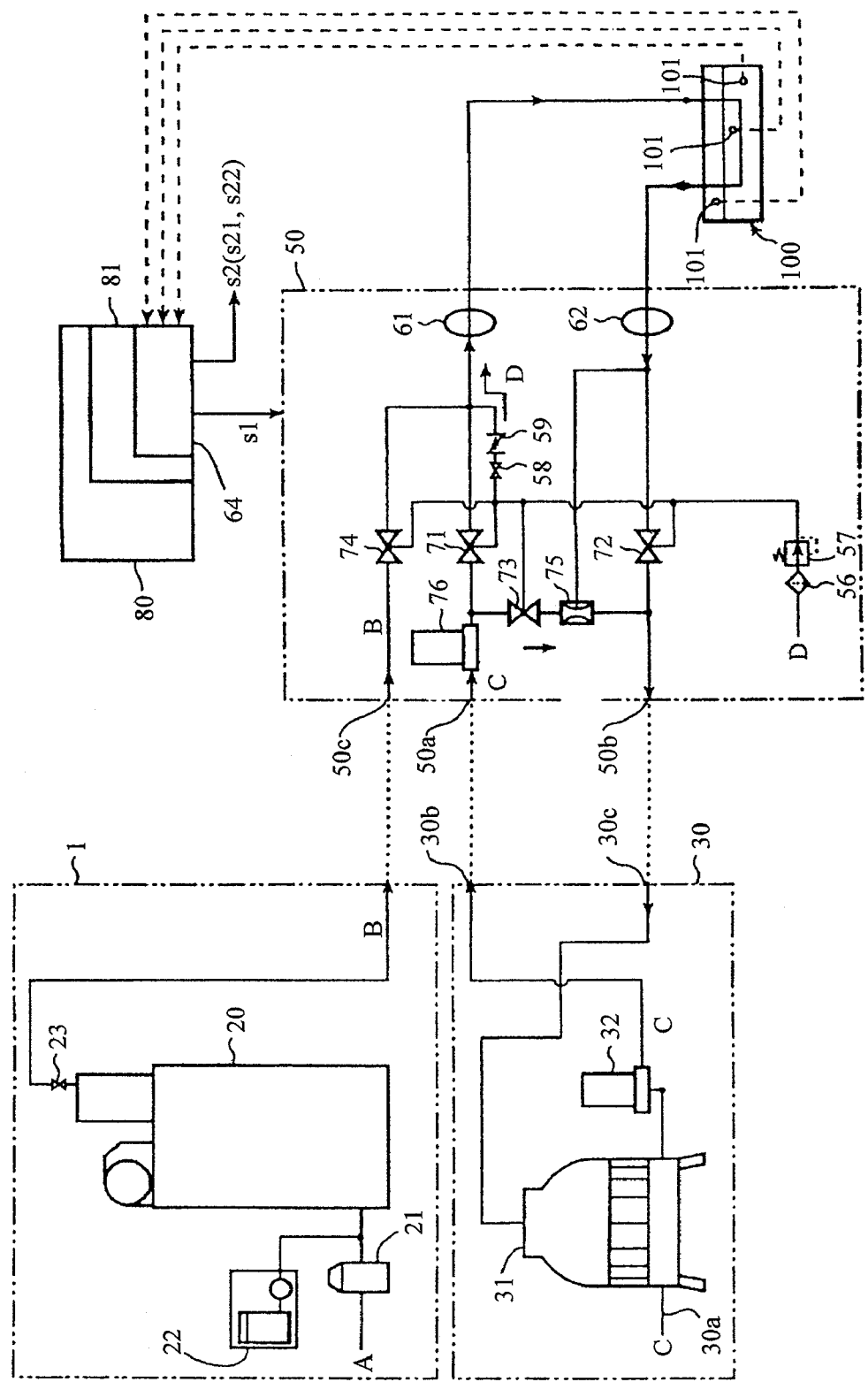
FIG. 4 is a piping construction view of respective elements constructing a molding machine system of Embodiment 2 according to the present invention.
Figure 5:
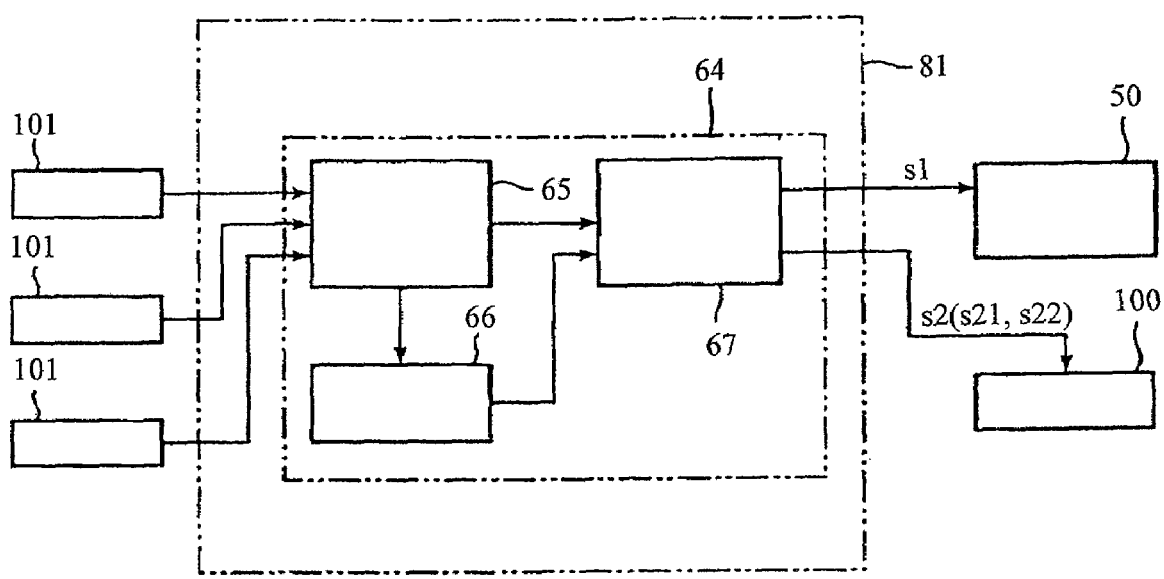
FIG. 5 is a block diagram showing temperature sensors and a molding control means of the Embodiment 2.

In the molding machine system of the present Embodiment 2, the control means 64 comprises, as shown in FIG. 4, the program storing part 65 storing the temperature judging program, the timer 66 putting out the time set signal and the control signal generating part 67. The control signal generating part 67 generates, based on the judgement result by the temperature judging program and time set signal, the control signal s1 for controlling change-overs of the heating medium, cooling medium and pressurized air to be supplied into the mold 100 at the change-over valve unit 50 and the control signal s2 for controlling molding operations of mold closing, mold opening and the like at the mold 100.

The temperature judging program stored in the program storing part 65 judges, based on the detected temperatures of the respective (three, for example) temperature sensors 101, as in the case of the Embodiment 1, that one or more of these detected temperatures or an average thereof has reached a set temperature and puts out the judgement result into the control signal generating part 67.

As soon as the temperature judging program judges that the set temperature is achieved at the heating step or cooling step, for example, as in the case of the Embodiment 1, the timer 66 starts to count the time and puts out the time set signal into the control signal generating part 67.

In the molding machine system of the present Embodiment 2 as mentioned above, respective operations of the mold 100 including the steps of mold closing and heating, injection and pressure holding of resin, mold cooling, mold opening and taking-out of product as well as operations at the stand-by time are carried out, as in the case of the Embodiment 1, in accordance with the timings as shown in FIG. 3, based on the detected temperatures of the three temperature sensors 101, by the control means 64 provided on the control panel 81 of the molding machine main body 80.

According to the above-mentioned molding machine system of the present Embodiment 2 also, the judgement result (temperature judged value) based on the detected temperatures of the three temperature sensors 101 is combined with the time set signal from the timer 66 so that a control of operations of the mold 100 and change-over valve unit 50 is carried out by the control means 64 installed on the control panel 81 of the molding machine main body 80. Thereby, as in the case of the Embodiment 1, a flow-in timing of the steam B to flow into the mold 100 in the heating step, an injection timing of the resin to be injected into the mold 100, a flow-in timing of the cooling water C to flow into the mold 100 in the cooling step and a blow timing of the air (pressurized air) D to be blown into the mold 100 in the cooling step for preventing an excess cooling of the mold 100 become possible to be freely changed. Hence, a molding cycle putting importance on the temperature of the mold 100 or having a freedom of temperature control of the mold 100 can be realized.

That is, the control is carried out by the above-mentioned judgement result (temperature judged value) being combined with the time set signal so that the heating step and cooling step are carried out in the optimal temperature range necessitated for the product molding. Thus, a stability of quality of the product can be enhanced.

While the judgement result based on the detected temperatures of the above-mentioned three temperature sensors 101 is used such that the temperature judging program judges that any one or more of, or an average of, the detected temperatures has reached a set temperature, if, as one example, any one of the detected temperatures of the three temperature sensors 101 is used as the judgement result, then in a quicker manner, the judgement result can be obtained and the control of operations of the heating step and cooling step can be likewise carried out. Also, for example, if two or more of, or the average of, the detected temperatures of the three temperature sensors 101 are used as the judgement result, then a control of operations of the heating step and cooling step that accurately reflects the temperature of the mold 100 can be carried out.

By employing the molding machine system of the present Embodiment 2 also, it was found that the time of the molding cycle of a product of which thickness is large can be shortened approximately to one third as compared with the conventional case.

INDUSTRIAL APPLICABILITY

The present invention can be widely applied not only to the above-mentioned molding machines carrying out the resin molding but also to various molding machines producing molded products made of metal materials.

What is claimed is:

1. A molding machine system repeating a molding cycle, said molding cycle comprising steps of closing and heating of a mold, injection and pressure holding of a molding material, cooling and opening of said mold, taking-out of a molded product and closing of said mold for the next cycle, wherein:
   said molding machine system comprises;
   a plurality of temperature detecting portions arranged at predetermined places of said mold,
   a change-over valve unit having a heat medium channel by which heating medium from a heating unit, cooling medium from a cooling unit and pressurized air are changed over to be supplied into and recovered from said mold and
   a molding control means having a temperature judging program judging respective detected temperatures of said plurality of temperature detecting portions to give a judgement result and a timer to give a time set signal,
   a molding operation control is carried out by combining the judgement result given by said temperature judging program with the time set signal given by said timer and
   said molding operation control enables an arbitrary supply control of said heating medium and cooling medium to be supplied into said mold from said change-over valve unit at the time of the mold heating step and mold cooling step and an arbitrary supply control of said molding material to be supplied into said mold.

2. A molding machine system repeating a molding cycle, said molding cycle comprising steps of closing and heating of a mold, injection and pressure holding of a molding material, cooling and opening of said mold, taking-out of a molded product and closing of said mold for the next cycle, wherein:
   said molding machine system comprises;
   a plurality of temperature detecting portions arranged at predetermined places of said mold,
   a change-over valve unit having a heat medium channel by which heating medium from a heating unit, cooling medium from a cooling unit and pressurized air are changed over to be supplied into and recovered from said mold and
   a molding control means having a temperature judging program judging respective detected temperatures of said plurality of temperature detecting portions to give judgement results that one or more of or an average of said respective detected temperatures has reached a set temperature and a timer to give a time set signal,
   a molding operation control is carried out by combining any one of the judgement results given by said temperature judging program with the time set signal given by said timer and
   said molding operation control enables an arbitrary supply finish timing control of said heating medium to be supplied into said mold from said change-over valve unit at the time of the mold heating step, a supply delay control and arbitrary supply finish timing control of said cooling medium to be supplied into said mold from said change-over valve unit at the time of the mold cooling step and an arbitrary supply control of said pressurized air to be supplied into said mold at the time of the mold cooling step as well as an arbitrary supply control of said molding material to be supplied into said mold.

3. A molding machine system repeating a molding cycle, said molding cycle comprising steps of closing and heating of a mold, injection and pressure holding of a molding material, cooling and opening of said mold, taking-out of a molded product and closing of said mold for the next cycle, wherein:
   said molding machine system comprises;
   a plurality of temperature detecting portions arranged at predetermined places of said mold,
   a change-over valve unit having a heat medium channel by which heating medium from a heating unit, cooling medium from a cooling unit and pressurized air are changed over to be supplied into and recovered from said mold and
   a molding control means, provided on said change-over valve unit, having a temperature judging program judging respective detected temperatures of said plurality of temperature detecting portions to give a judgement result and a timer to give a time set signal,
   a molding operation control is carried out by combining the judgement result given by said temperature judging program with the time set signal given by said timer and
   said molding operation control enables an arbitrary supply control of said heating medium, cooling medium and pressurized air to be supplied into said mold from said change-over valve unit at the time of the mold heating step and mold cooling step and an arbitrary supply control of said molding material to be supplied into said mold.

4. A molding machine system repeating a molding cycle, said molding cycle comprising steps of closing and heating of a mold, injection and pressure holding of a molding material, cooling and opening of said mold, taking-out of a molded product and closing of said mold for the next cycle, wherein:
said molding machine system comprises;
a plurality of temperature detecting portions arranged at predetermined places of said mold,
a change-over valve unit having a heat medium channel by which heating medium from a heating unit, cooling medium from a cooling unit and pressurized air are changed over to be supplied into and recovered from said mold and
a molding control means, provided on said change-over valve unit, having a temperature judging program judging respective detected temperatures of said plurality of temperature detecting portions to give judgement results that one or more of or an average of said respective detected temperatures has reached a set temperature and a timer to give a time set signal,
a molding operation control is carried out by combining any one of the judgement results given by said temperature judging program with the time set signal given by said timer and
said molding operation control enables an arbitrary supply finish timing control of said heating medium to be supplied into said mold from said change-over valve unit at the time of the mold heating step, a supply delay control and arbitrary supply finish timing control of said cooling medium to be supplied into said mold from said change-over valve unit at the time of the mold cooling step and an arbitrary supply control of said pressurized air to be supplied into said mold at the time of the mold cooling step as well as an arbitrary supply control of said molding material to be supplied into said mold.

5. A molding machine system repeating a molding cycle, said molding cycle comprising steps of closing and heating of a mold, injection and pressure holding of a molding material, cooling and opening of said mold, taking-out of a molded product and closing of said mold for the next cycle, wherein:
said molding machine system comprises;
a plurality of temperature detecting portions arranged at predetermined places of said mold,
a change-over valve unit having a heat medium channel by which heating medium from a heating unit, cooling medium from a cooling unit and pressurized air are changed over to be supplied into and recovered from said mold and
a molding control means, provided on a molding machine main body, having a temperature judging program judging respective detected temperatures of said plurality of temperature detecting portions to give a judgement result and a timer to give a time set signal,
a molding operation control is carried out by combining the judgement result given by said temperature judging program with the time set signal given by said timer and
said molding operation control enables an arbitrary supply control of said heating medium, cooling medium and pressurized air to be supplied into said mold from said change-over valve unit at the time of the mold heating step and mold cooling step and an arbitrary supply control of said molding material to be supplied into said mold.

6. A molding machine system repeating a molding cycle, said molding cycle comprising steps of closing and heating of a mold, injection and pressure holding of a molding material, cooling and opening of said mold, taking-out of a molded product and closing of said mold for the next cycle, wherein:
said molding machine system comprises;
a plurality of temperature detecting portions arranged at predetermined places of said mold,
a change-over valve unit having a heat medium channel by which heating medium from a heating unit, cooling medium from a cooling unit and pressurized air are changed over to be supplied into and recovered from said mold and
a molding control means, provided on a molding machine main body, having a temperature judging program judging respective detected temperatures of said plurality of temperature detecting portions to give judgement results that one or more of or an average of said respective detected temperatures has reached a set temperature and a timer to give a time set signal,
a molding operation control is carried out by combining any one of the judgement results given by said temperature judging program with the time set signal given by said timer and
said molding operation control enables an arbitrary supply finish timing control of said heating medium to be supplied into said mold from said change-over valve unit at the time of the mold heating step, a supply delay control and arbitrary supply finish timing control of said cooling medium to be supplied into said mold from said change-over valve unit at the time of the mold cooling step and an arbitrary supply control of said pressurized air to be supplied into said mold at the time of the mold cooling step as well as an arbitrary supply control of said molding material to be supplied into said mold.

* * * * *